W. Whiteley, Jr.,
Harvester Rake.
No. 16131
Patented Nov. 25, 1856.
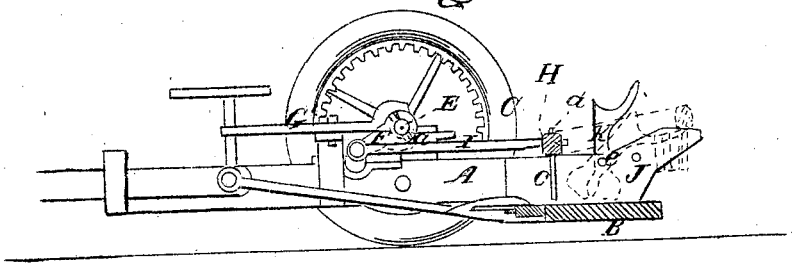
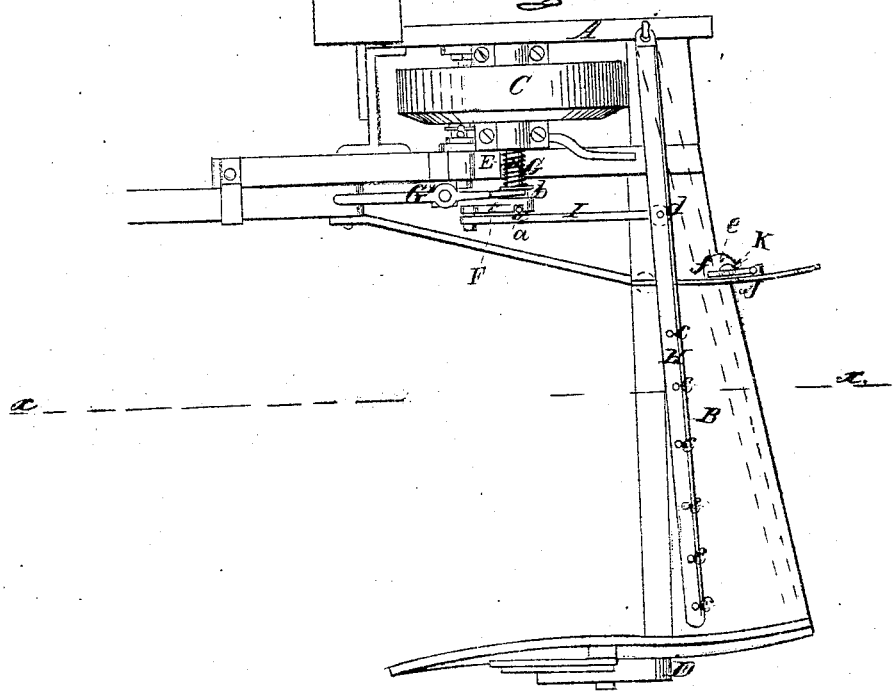

UNITED STATES PATENT OFFICE.

W. WHITELEY, JR., OF SPRINGFIELD, OHIO.

IMPROVED RAKING ATTACHMENT FOR HARVESTERS.

Specification forming part of Letters Patent No. 16,131, dated November 25, 1856.

*To all whom it may concern:*

Be it known that I, WILLIAM WHITELEY, Jr., of Springfield, in the county of Clarke and State of Ohio, have invented a new and Improved Raking Attachment to be Applied to Harvesters; and I do hereby declare that the following is a full, clear, and exact description of the same, reference being had to the annexed drawings, making a part of this specification, in which—

Figure 1 is a transverse vertical section of my improvement, $x$ $x$, Fig. 2, showing the plane of section. Fig. 2 is a plan or top view of the same.

Similar letters of reference indicate corresponding parts in the two figures.

My invention consists in the employment or use, in operating the rakes of harvesters, of a weighted lever and plate arranged as will be hereinafter fully shown and described.

To enable those skilled in the art to fully understand and construct my invention, I will proceed to describe it.

A represents the main frame of a harvester, and B is the platform attached to its back end, the platform projecting outward and one side of the main frame.

C is the driving-wheel, placed in the main frame A, and D is a wheel which is placed at the outer end of the platform.

The axle E of the driving-wheel C extends inward some distance beyond its inner bearing, and has a crank, F, placed loosely upon it. A pin, $a$, passes transversely through the inner end of the axle E, and a groove is made in the crank, the pin $a$ fitting in the groove and causing the crank to turn with the axle. The crank is kept up to the pin, so that the latter is retained in the groove by means of a spiral spring, G, which encompasses the axle. The crank F—the portion or end that fits on the axle—has a groove, $b$, made in it to receive the forked end of a lever, G', by which the crank may be thrown out of gear with the pin $a$, and consequently detached from the axle E when necessary.

H represents a rod, one end of which is attached by an eye and staple to the outer side of the main frame A and at the back side of the driving-wheel. The rod H extends the whole length of the platform, and has teeth $c$ attached to its inner side to form a rake, the teeth extending along the whole length of the platform, or that portion of it on which the cut grain falls.

I represents a pitman, one end of which is attached to the crank F, and the opposite end is secured by a pin, $d$, in a slot in the rod H.

J represents a plate which is attached to the platform B. This plate projects upward a suitable distance, and the rod H rests upon it. The outer end of the plate is curved upward, as shown clearly in Fig. 1.

To one side of the plate J a lever, K, is attached by a pivot, $e$. The upper end of the lever is forked, and the lower end has a weight, $f$, attached to it, said weight keeping the lever in a vertical position when not acted upon by the rod H.

The operation will be readily seen. As the machine is drawn along the rod H is moved back and forth over the platform by the crank and pitman, the rod H working from its point of attachment to the main frame A, that point being the center of motion. As the rod H is moved backward the teeth $c$ rake the grain off the back end of the platform B, the rod and teeth being elevated as they pass off the platform by the elevated outer part of the plate J, so that the teeth are freed or disengaged from the grain and do not interfere with its proper discharge from the platform. As the rod H passes forward it catches into the fork of the lever K, which throws the bar upward, and the teeth $c$ are consequently prevented from coming in contact with the cut grain as it falls upon the platform. One prong of the lever K is longer than the other, so that the rod H, in passing backward, not only throws over the upper end of the lever, but retains it in that position till it is moved forward toward the front end of the platform.

The above invention is extremely simple and efficient. There are no parts liable to get out of repair, and the size of the gavels may be varied as desired, the driver operating the lever G' with the foot and throwing the crank F out of gear with the axle E at the proper time.

Having thus described my invention, what I claim as new, and desire to secure by Letters Patent, is—

The combination of the balance-lever K with plate J for operating the rake H $c$ in its forward motion, in the manner and for the purpose set forth.

WILLIAM WHITELEY, JUN.

Witnesses:
P. SPININGS,
DAVID K. NITCHMAN.